United States Patent
Rennie et al.

[11] Patent Number: 5,851,450
[45] Date of Patent: Dec. 22, 1998

[54] APPARATUS AND METHOD FOR USE IN APPLYING PARTICLES TO AN EXTERNAL LAYER OF UNCURED RESIN OF A COATING OF AN OPTICAL FIBRE UNIT

[75] Inventors: Andrew James Rennie, Old Harlow; Thomas Curley, London, both of England

[73] Assignee: Pirelli General plc, United Kingdom

[21] Appl. No.: 688,475

[22] Filed: Jul. 30, 1996

[30] Foreign Application Priority Data

Aug. 3, 1995 [GB] United Kingdom .................. 9515910

[51] Int. Cl.[6] .................................................. B29D 11/00
[52] U.S. Cl. .............................. 264/1.28; 118/64; 118/65; 118/DIG. 5; 427/163.2; 427/185
[58] Field of Search .................................. 264/1.24, 1.27, 264/1.28, 1.29, 1.1, 518, DIG. 50, DIG. 51; 425/80.1; 427/163.2, 185, 163.1; 118/62, 63, 64, 65, DIG. 5

[56] References Cited

U.S. PATENT DOCUMENTS

| | | |
|---|---|---|
| 4,541,979 | 9/1985 | Cooke et al. .......................... 264/1.29 |
| 4,964,733 | 10/1990 | Fredriksson et al. . |
| 5,042,907 | 8/1991 | Bell et al. ............................. 427/163.2 |
| 5,049,415 | 9/1991 | Kundis ................................... 427/185 |
| 5,555,335 | 9/1996 | Barker et al. . |
| 5,557,703 | 9/1996 | Barker et al. . |
| 5,580,241 | 12/1996 | Koeberle . |

FOREIGN PATENT DOCUMENTS

| | | |
|---|---|---|
| 345968 | 5/1989 | European Pat. Off. . |
| 521710 | 7/1992 | European Pat. Off. . |
| 637573 | 8/1994 | European Pat. Off. . |
| 1522097 | 9/1976 | United Kingdom . |
| 2073620 | 10/1981 | United Kingdom . |
| 2187133 | 2/1986 | United Kingdom . |

OTHER PUBLICATIONS

Patent Abstracts of Japan–vol. 7, No. 219, (C–188) Sep. 29, 1983.

*Primary Examiner*—Mathieu D. Vargot
*Attorney, Agent, or Firm*—Brooks Haidt Haffner & DeLahunty

[57] ABSTRACT

Apparatus for use in applying particles to an external layer of uncured resin material of a coating of an optical fibre unit with at least one optical fibre, said apparatus including means (50) defining an axially extending through-passage (52) through which, in use, such an optical fibre unit is passed, said passage defining means having an inlet (62) for admitting fluidized particles into said through-passage, and said through-passage being provided with means (64) for generating turbulence in such fluidized particles in said through-passage.

68 Claims, 4 Drawing Sheets

# APPARATUS AND METHOD FOR USE IN APPLYING PARTICLES TO AN EXTERNAL LAYER OF UNCURED RESIN OF A COATING OF AN OPTICAL FIBRE UNIT

BACKGROUND OF THE INVENTION

1. Field of the Invention

This invention relates to optical fibre assemblies for blown installation and more particularly to such assemblies as disclosed in EP-A-0345968, EP-A-0521710 and EP-A-0646818 (to which reference is directed) in which the assembly comprises an optical fibre unit comprising at least one optical fibre having a coating comprising an external layer disposed over an inner buffer layer, the external layer containing particulate matter which projects from the outer surface of that layer.

2. Description of Related Art

Like EP-A-0521710 and EP-A-0646818, this invention is particularly concerned with such assemblies in which the optical fibre unit comprises a plurality of optical fibres, but nevertheless it is also applicable to such assemblies in which the optical fibre unit comprises just one optical fibre as in the illustrated embodiments of EP-A-0345968.

In EP-A-0345968 the particulate matter is mixed with the material of the external coating prior to application of that coating which leads to the presence of the particulate matter at the interface between the external layer and the inner buffer layer which, it is concluded in EP-A-052171 leads to the formation of cracks during bending of the assembly and is the probable cause of poor 'fibre breakout' performance on bending particularly when the system of EP-A-0345968 is applied to such optical fibre assemblies in which the optical fibre unit comprises a plurality of optical fibres and thus need to have larger diameters than assemblies in which the fibre unit comprises a single optical fibre.

To overcome the problem of poor fibre breakout performance, EP-A-0646818 discloses the provision of an intermediate layer of material between the inner buffer layer, and the external layer. The intermediate layer of material serves to arrest the propagation of cracks in the external layer towards the inner buffer layer. This solution has worked well but in use it has been found that the distance the optical fibre assembly can be installed by the blown fibre technique is variable. It is believed that this is because at the surface of the assembly the particulate matter is coated with the resin comprising the external layer. It is believed that for the same reason the distance the optical fibre assembly disclosed in EP-A-0345968 can be blown will also be variable.

To overcome the problem of poor fibre breakout performance, EP-A-0521710 discloses adding the particulate matter to the external layer after it has been applied and such that the innermost part of the layer is substantially free of the particulate matter.

In more detail, EP-A-0521710 discloses apparatus for use in applying particles to an external layer of uncured resin of a coating of an optical fibre unit comprising at least one optical fibre. The apparatus comprises means defining a chamber having an axially aligned inlet and an outlet through which, in use, such an optical fibre unit is passed, inlet means for admitting a flow of fluidised particles into the chamber and an outlet means for discharging such fluidised particles from said chamber. In order to provide a uniform distribution of particulate matter on the surface of the external layer, the particulate matter which typically comprises glass microspheres is electrostatically charged after fluidisation by means of a conventional electrostatic spray gun. The charged microspheres are attracted to the optical fibre unit while being mutually repulsive and thus, it is claimed, provide a uniform coverage of the external layer.

A problem with the system disclosed in EP-A-0521710 is that the charged particulate matter is attracted to surfaces other than the external layer of the fibre unit and can cause clogging of the chamber inlet and outlet through which the optical fibre unit must pass. In experiments it has been found that the process must be stopped to allow the inlet and outlet to be unblocked after the treatment of one kilometer or less of optical fibre unit.

SUMMARY OF THE INVENTION

It is an object of the invention to at least partially overcome the above-described problems. To this end, the invention broadly provides a system for applying particles to an external layer of uncured resin material of a coating of an optical fibre unit after the external layer has been applied in which the above-described clogging problem caused by the use of electrostatically charged particulate matter is substantially prevented.

The invention includes apparatus for use in applying particles to an external layer of uncured resin material of a coating of an optical fibre unit comprising at least one optical fibre, said apparatus comprising means defining an axially extending through-passage through which, in use, such an optical fibre unit is passed, said passage defining means having an inlet for admitting fluidised particles into said through-passage, and said through-passage being provided with means for generating turbulence in such fluidised particles in said through-passage.

The turbulence generating means may comprise at least one restriction in said through-passage.

Advantageously, the or each restriction is defined by a surface of said through-passage defining means which surface defines said through-passage.

The turbulence generating means may additionally, or alternatively comprise at least one auxiliary passage having an outlet end arranged for discharging fluidised particles into said through-passage.

In an embodiment described hereinbelow, the through-passage defining means comprises a plurality of segments each defining a part of a length of said through-passage, said segments being fitted together in end-to-end relationship and each segment defining at least one auxiliary passage, said segments being fitted together in end-to-end relationship such that the auxiliary passage or passages of each segment are radially offset from the auxiliary passage or passages of the or each adjacent segment. The auxiliary passages in the above-mentioned embodiment are arranged to receive fluidised particles from the through-passage.

Advantageously, the inlet for admitting fluidised particles into said through-passage is substantially perpendicular to the axis of said through-passage.

Preferably the apparatus further comprises means defining a chamber in which at least a downstream end of said through-passage defining means is housed, said chamber defining means having an outlet for such an optical fibre unit and discharge means for discharging such fluidised particles from said chamber.

Advantageously, the chamber defining means is provided with gas passage means for directing at least one gas stream into said chamber at least in the region of said outlet of the chamber defining means for substantially preventing blockage of at least said outlet of the chamber means by fluidised particles and preferably the gas passage means is arranged to direct at least one said gas stream into said outlet of the chamber defining means.

Advantageously, the apparatus further comprises deflecting means disposed in said chamber for deflecting fluidised particles away from said outlet of the chamber defining means.

The invention also includes a method of manufacturing an optical fibre assembly for blown installation, comprising providing a fibre unit comprising at least one optical fibre having a coating comprising an external layer of uncured resin material, passing said unit through a turbulent flow of fluidised particles provided in an axially extending through-passage such that some of the particles adhere to said external layer of uncured resin material, and curing said external layer.

The method may comprise the step of generating said turbulent flow of fluidised particles by passing a flow of fluidised particles through at least one restriction provided in said through-passage.

The step of generating said turbulent flow may additionally, or alternatively comprise passing fluidised particles through at least one auxiliary passage and discharging said fluidised particles from the or each auxiliary passage into a flow of fluidised particles in said through-passage.

In an embodiment described hereinbelow, the fluidised particles are passed through a series of axially spaced auxiliary passages, each auxiliary passage being radially offset from the passage or passages axially adjacent thereto. In the abovementioned embodiment, the fluidised particles passed through the auxiliary passages are supplied from the flow of fluidised particles in the through-passage.

Advantageously, at least a downstream end of means defining said through-passage is disposed in a chamber having an outlet through which the optical fibre unit is passed and discharge means for discharging fluidised particles from the chamber, comprising the step of providing at least one gas stream into said chamber in the region of at least said outlet of the chamber for substantially preventing blockage of said outlet by fluidised particles.

Preferably, the or each gas stream is provided in said outlet of the chamber.

Advantageously, the method comprises the step of deflecting fluidised particles away from said outlet of the chamber.

The invention also includes apparatus for use in applying particles to an external layer of uncured resin material of a coating of an optical fibre unit comprising at least one optical fibre, said apparatus comprising means defining a chamber having an axially aligned inlet and outlet through which, in use, such an optical fibre unit is passed, inlet means for admitting a flow of fluidised particles into the chamber and an outlet means for discharging such fluidised particles from the chamber, said chamber defining means being provided with means for directing gas into said chamber in the region of said outlet and/or inlet for substantially preventing blockage thereof by such fluidised particles.

The invention also includes a method of manufacturing an optical fibre assembly for blown installation, comprising providing an optical fibre unit comprising at least one optical fibre having a coating comprising an external layer of uncured resin material, providing a flow of fluidised particles in a chamber, passing said unit successively through an inlet into said chamber and an outlet therefrom such that some of the particles adhere to said external layer of uncured resin material, directing gas into said chamber in the region of said outlet and/or inlet for at least substantially preventing said outlet and/or inlet from being blocked by said flow of fluid particles, and curing said external layer.

BRIEF DESCRIPTION OF THE DRAWINGS

In order that the invention may be well understood, some embodiments thereof, which are given by way of example, will now be described with reference to the accompanying drawings, in which.

DESCRIPTION OF PREFERRED EMBODIMENTS

Figure 1:
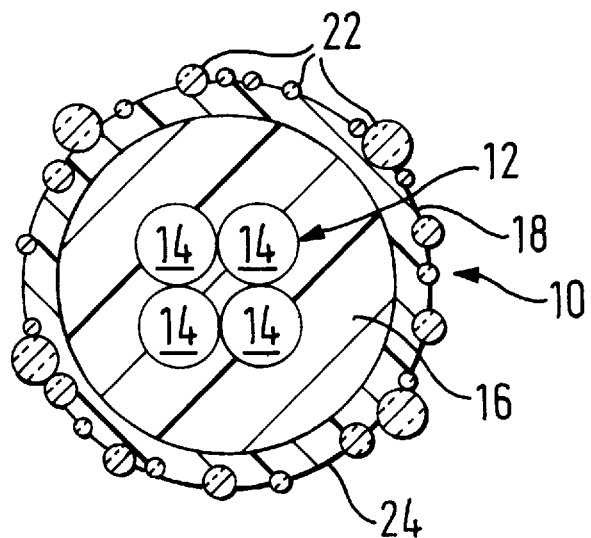
FIG. 1 is a schematic cross-section of an optical fibre assembly for blown installation.

FIG. 1 is a schematic cross-section of an optical fibre assembly 10 for blown installation. The illustrated assembly 10 comprises a fibre unit 12 comprising a plurality of optical fibres 14. The illustrated unit 12 comprises four optical fibres, but it is to be understood that it could comprise any number of fibres, for example eight, or only one and that the number of fibres incorporated in the fibre unit is not material to the present invention.

Each fibre 14 is provided with primary and secondary coatings as is conventional and the fibres are disposed with their secondary coatings touching. The fibre unit 12 is provided with a coating comprising an inner layer 16 and an external layer 18. Each layer comprises a radiation-cured polymer. The inner layer comprises a material having a lower modulus of elasticity than that of the external layer and forms a soft buffer layer for the fibre unit. The external layer which may for example be formed from Zeneca NEP 86 (Zeneca is a trade name of Zeneca Limited) is harder and more robust than the buffer layer and functions to protect the buffer layer and fibre unit. The external layer 18 contains particulate material in the form of hollow glass beads which project from the outer surface 24 of the external layer 18.

It is to be understood that the illustrated fibre assembly 10 is given by way of example only and the apparatus and method of the present invention can be utilized for applying particulate matter to an external layer of uncured resin material of a coating of an optical fibre unit regardless of the configuration of the inner and, if provided, any intermediate layers of the coating.

Figure 2:
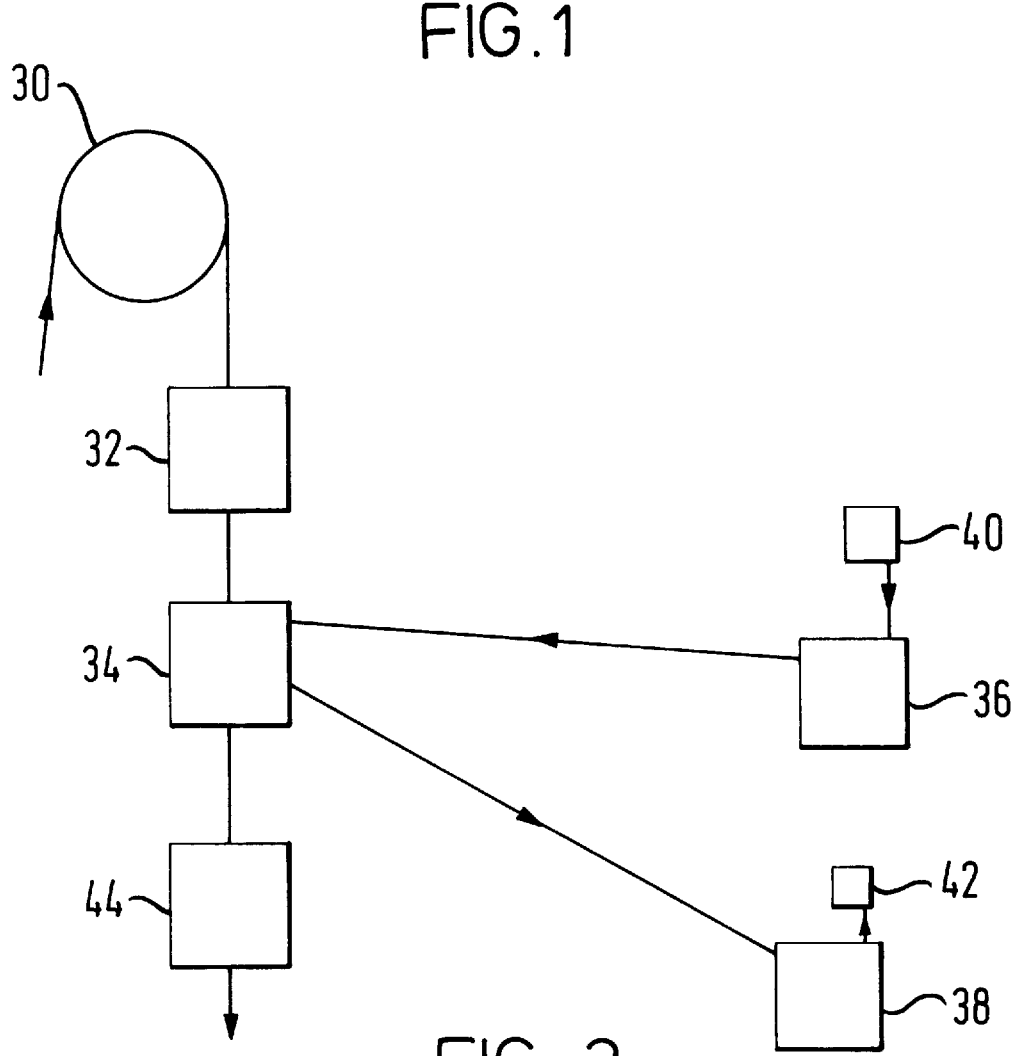
FIG. 2 is a schematic representation of a portion of a manufacturing line for manufacturing an optical fibre assembly for blown installation.

A portion of a manufacturing line for manufacturing an optical fibre assembly such as the assembly 10 is schematically illustrated in FIG. 2. The manufacturing line comprises a guide wheel 30 at which the fibre unit is received having already been formed and coated with the layer 16 by conventional processing techniques which will be familiar to the skilled person. Downstream of the guide wheel 30 is an applicator 32 for applying the external layer 18. An apparatus 34 for applying particles to the external layer 18 is disposed downstream of the applicator 32 and is connected with a container 36 which contains the particles which are to be input to the apparatus 34 and a collection vessel 38 for particles which have passed through the apparatus 34 without adhering to the external layer 18. The container 36 is connected to a source 40 of pressurised air which in use provides a flow of pressurised air into the container. The flow of pressurised air provides a degree of fluidisation of the particles in the container and causes a flow of fluidised particles to move in the direction of the apparatus 34. The collection vessel 38 is connected with a vacuum source 42 for drawing particles from the apparatus 34 into the collection vessel. Downstream of the apparatus 34 is an ultra violet (UV) lamp 44 for curing the resin material which forms the external layer 18.

Although not shown, it will be appreciated that downstream of the UV lamp 44, conventional means can be provided for checking the diameter of, marking and coiling the assembly 10 in preparation for despatch to the consumer.

The apparatus 34 will now be described in detail with reference to FIGS. 3 to 5. The apparatus 34 comprises means 50 defining an axially extending through-passage 52 through which, in use, the optical fibre unit 12 is passed. The through-passage defining means 50 comprises a cylindrical upstream support portion 54 and a plurality of segments 56 fitted together in end-to-end relationship at the downstream end of the support portion 54.

The upstream end of the support portion 54 is fitted with a cap 58 which has a through-hole which defines an inlet 60 for admitting the fibre unit 12 to the through-passage 52. An inlet 62 for admitting fluidised particles into the through-passage 62 is defined by a through-hole in the side wall of the support portion 54. The inlet 62 is perpendicular to the axis of the through-passage 52.

The support portion 54, segments 56 and cap 58 are preferably made of a plastics material such as polyester (PETP) and bonded together with an adhesive such as Loctite (Registered Trade Mark) 401.

An inner surface of each segment 56 which defines the through-passage 52 is shaped to define a triangular section rib 64. The ribs 64 extend circumferentially of the through-passage and define a plurality of axially spaced restrictions in the through-passage for generating turbulence in the fluidised particles which, in use, flow through the through-passage.

The through-passage defining means 50 is housed in a chamber 68 defined by three tubular elements 70, 72, 74 which are fitted together in end-to-end relationship and respective end parts 76, 78 fitted to the elements 70 and 74. The end part 76 comprises an axially extending through-hole which defines an inlet 80 for admitting the fibre unit 12 into the chamber 68. The end part 78 comprises an axially extending through-hole which defines an outlet 82 for the fibre unit 12.

The support portion 54 is fixed to the tubular element 70 by means of screws 84 which threadingly engage in respective bushes 85 which are fitted to the support portion 54. The bushes 85 are preferably made of polyester (PETP) and bonded to the support portion 54.

The tubular element 70 has a through-hole defining an inlet 86 into which an input tube 88 is fitted. The input tube 88 extends into the inlet 62 and in use is connected with the container 36 such that fluidised particles from the container are communicated with the through-passage 52.

The tubular element 74 has a through-hole 90 into which a discharge tube 92 is fitted. In use, the tube 92 is connected with the vessel 38 such that particles which have passed through the through-passage 52 and not adhered to the external layer 18 can be discharged from the chamber 68 and collected in the vessel 38.

The end parts 76, 78 are each provided with gas passage means for directing gas into the chamber 68. In more detail, the end part 76 has gas passage means arranged to direct a plurality of gas streams into the inlet 80 and the end part 78 has gas passage means arranged to discharge a plurality of gas streams into the outlet 82.

Figure 5:
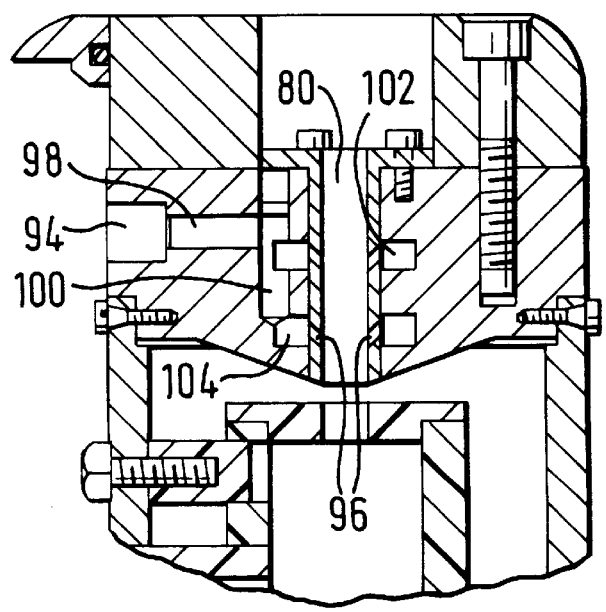
FIG. 5 is an enlargement of a portion of FIG. 3.

As best seen in FIG. 5, the gas passage means of the end part 76 comprises an entry port 94 which is adapted to be connected with a supply of pressurised gas. The port 94 communicates with four nozzles 96 via a plurality of interconnecting passages 98, 100, 102 and 104. The nozzles 96 are inclined with respect to the axis of the inlet 80 such that the respective gas streams emitted therefrom are directed into the inlet 80 in the general direction of the chamber 68.

The gas passage means of the end part 78 comprises a similar arrangement of four nozzles 106 which communicate via arcuate passages 108 with a passage 110. The passage 110 communicates with a passage 112 and an entry port 113 provided in a disc-like part 114 fitted to the downstream end of the end part 74. The disc-like part 114 has a through-bore 116 which is aligned with the outlet 82.

The gas streams or jets emitted into the inlet 80 and outlet 82 serve to prevent blockage thereof by substantially preventing the entry of the fluidised particles which are blown away from the inlet/outlet.

The end part 78 comprises deflecting means in the form of a generally conical portion 118 disposed in the chamber 68. The inclined surface of the conical portion 118 is arranged such that particles are deflected away from the outlet 82 to prevent the accumulation of particles around the outlet thereby further reducing the possibility of the outlet being blocked by the particles.

The end part 76 likewise comprises deflecting means in the form of a generally conical portion 120 for deflecting particles away from the inlet 80 and thereby preventing the accumulation of particles at the inlet.

In use, a fibre optical unit 12 having a coating comprising an external layer 18 of uncured resin material is passed successively through the inlet 80, through-passage 52 and outlet 82. Pressurised air from the source 40 is passed into the container 36 causing a flow of fluidised particles to move in the direction of the input tube 88. The flow of particles is admitted to the through-passage 52 via the input tube and passes into the chamber 68 from where it is caused to flow to the collection vessel 38 via the discharge tube 92. As the optical fibre unit passes through the through-passage 52, the layer 18 is coated with the particles 22. On exiting the chamber 68 via the outlet 82, the optical fibre unit passes the UV lamp 44 to cure the resin and thus fix the particles.

It will be appreciated that since the flow of particles is constrained to make a 90° turn on entering the through-passage, a degree of turbulence is generated in the flow. As the flow of particles progresses downstream through the through-passage 52, it passes through the restrictions defined by the ribs 64 and is thereby caused to successively expand and contract. The expansion and contraction of the flow serves to generate turbulence therein. It will be appreciated that the turbulence of the particle flow ensures that the layer 18 is evenly coated with particles.

The particles which do not adhere to the layer 18 flow from the downstream end of the through-passage 52 into the chamber 68. The discharge tube 92 is connected with the collection vessel 38 and the vacuum source 42 is applied for drawing particles from the chamber 68 via the tube 92 into the vessel 38. It will be appreciated that the combination of the pressure source 40 pushing particles into the through-passage and the vacuum source 42 drawing particles from the discharge tube 92 ensures a continuous flow of particles through the apparatus 34.

Particles leaving the through-passage 52 tend to swirl around in the chamber 68 before being drawn through the discharge tube 92. These particles are substantially prevented from entering the inlet 80 and outlet 82 by the jets of gas emitted by the nozzles 96 and 106 and are prevented from accumulating around the inlet and outlet by the inclination of the respective surfaces of the conical portions 118, 120. By these means, blockage of the inlet 80 and outlet 82 by the particles in the chamber 68 is prevented. It has been found in experimental trials that the apparatus 34 can continuously process 10 Km of optical fibre assembly 10 without the inlet and outlet becoming blocked and much longer lengths could be so processed if desired.

It will also be appreciated that since the particulate matter typically comprises hollow glass beads having a diameter in the region of 35 µm that it is preferable that these are confined to the apparatus and not allowed to escape to the ambient atmosphere where they may be breathed in by operatives or cause damage to the moving parts of adjacent apparatus. It will be understood that the provision of the gas jets at the inlet 80 and outlet 82 of the chamber 68 substantially prevents escape of the particles from the chamber via the inlet or outlet.

Figure 6:
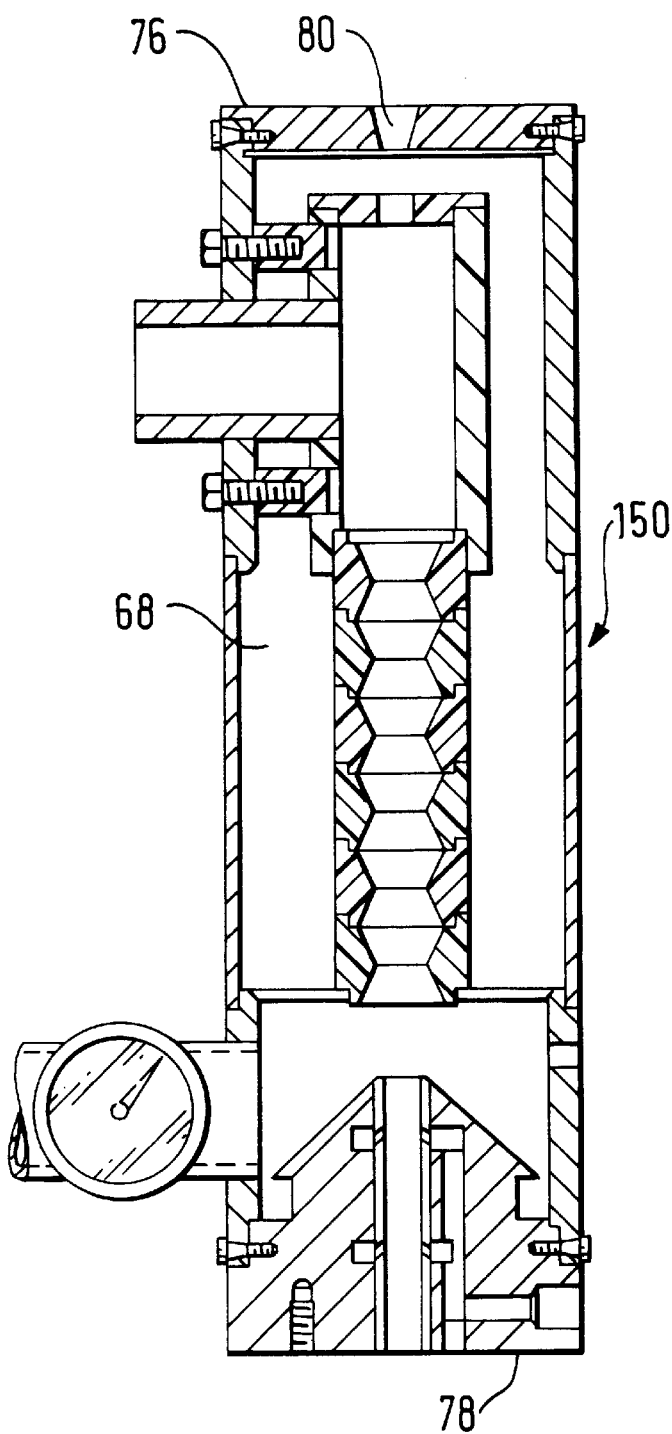
FIG. 6 is a cross-sectional view showing a modified apparatus for use in applying particles to an external layer of uncured resin material of a coating of an optical fibre unit.

A modified apparatus 150 for use in applying particles to an external layer of uncured resin material of a coating of uncured resin material of a coating of an optical fibre unit is shown in FIG. 6. The apparatus 150 is similar to the apparatus 34 and accordingly like reference numerals will be used to refer to like features.

The end part 76 is a disc-like cap provided with an inlet 80 for the optical fibre unit. Unlike the end part 76 of the apparatus 34, the end part 76 of the apparatus 150 does not comprise gas passage means or a conical deflecting means. It will be appreciated that if the apparatus 150 is orientated substantially vertically, the likelihood of the inlet 80 becoming blocked by particles will be reduced and therefore that the gas passage means and conical deflecting portion may not be required.

The end part 78 of the apparatus 150 comprises the entry port 112 for the gas passage means and a separate disc-like part 114 is not provided thus reducing the number of parts of the apparatus.

Figure 7:
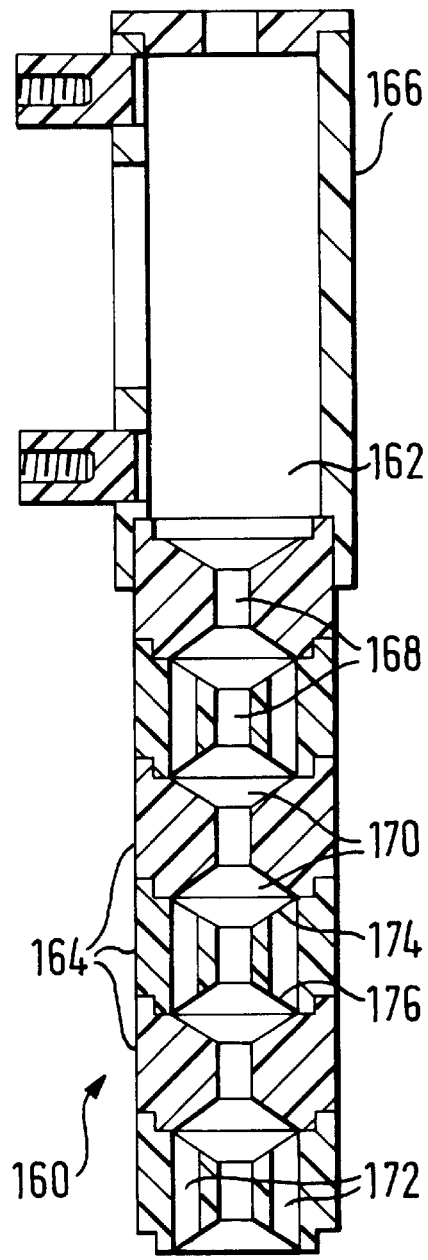
FIG. 7 is a cross-sectional view of an alternative through-passage defining means.

An alternative through-passage defining means 160 which is provided with a modified turbulence generating means is shown in FIG. 7. As with the through-passage defining means 50, the downstream end portion of the through-passage 162 is defined by a plurality of segments 164 fitted together in end-to-end relationship at the downstream end of a support portion 166.

The segments 164 each have a centrally disposed through-bore 168, the ends of which open into respective frusto-conical recesses 170 provided at each end of the segments 164. The through-bores 168 and recesses 170 each define a portion of the through-passage 162 which comprises a plurality of axially spaced restrictions. The segments 164 each define a plurality of auxiliary passages 172. In more detail, the segments each comprise four auxiliary passages 172 uniformly disposed about the through-bore 168. When the segments are assembled, the auxiliary passages are aligned such that the auxiliary passages in adjoining segments are non-aligned. In the arrangement shown in FIG. 7, the auxiliary passages of adjoining segments are radially offset by 45° when viewed in the axial direction of the through-passage 162. The auxiliary passages have an inlet end 174 for receiving fluidised particles from the through-passage 162 and an outlet end 176 for discharging fluidised particles into the through-passage.

It will be appreciated that in use as the flow of fluidised particles progresses downstream through the through-passage 162 it passes successively through a series of restrictions and expansion portions. The restrictions are defined by the through-bore 168 and upstream recesses 170 of the segments and the expansion portions are defined by the downstream recesses 170 of the segments. Thus, the flow of particles is caused to successively expand and contract which generates turbulence in the flow. Furthermore, portions of the flow of particles are diverted from the through-passage 162 into the auxiliary passages entering at the respective inlet ends 174. The particles which enter the auxiliary passages are discharged from the respective outlet ends 176 into the expansion portions defined by the downstream recesses 170 increasing the turbulence in the main flow. It will be appreciated that the proximity of the outlet ends 176 to the wall which defines the frusto-conical recess 170 of the downstream adjoining segment causes the particles to be deflected by the wall thus adding to the turbulence generated in the flow.

Figure 3:
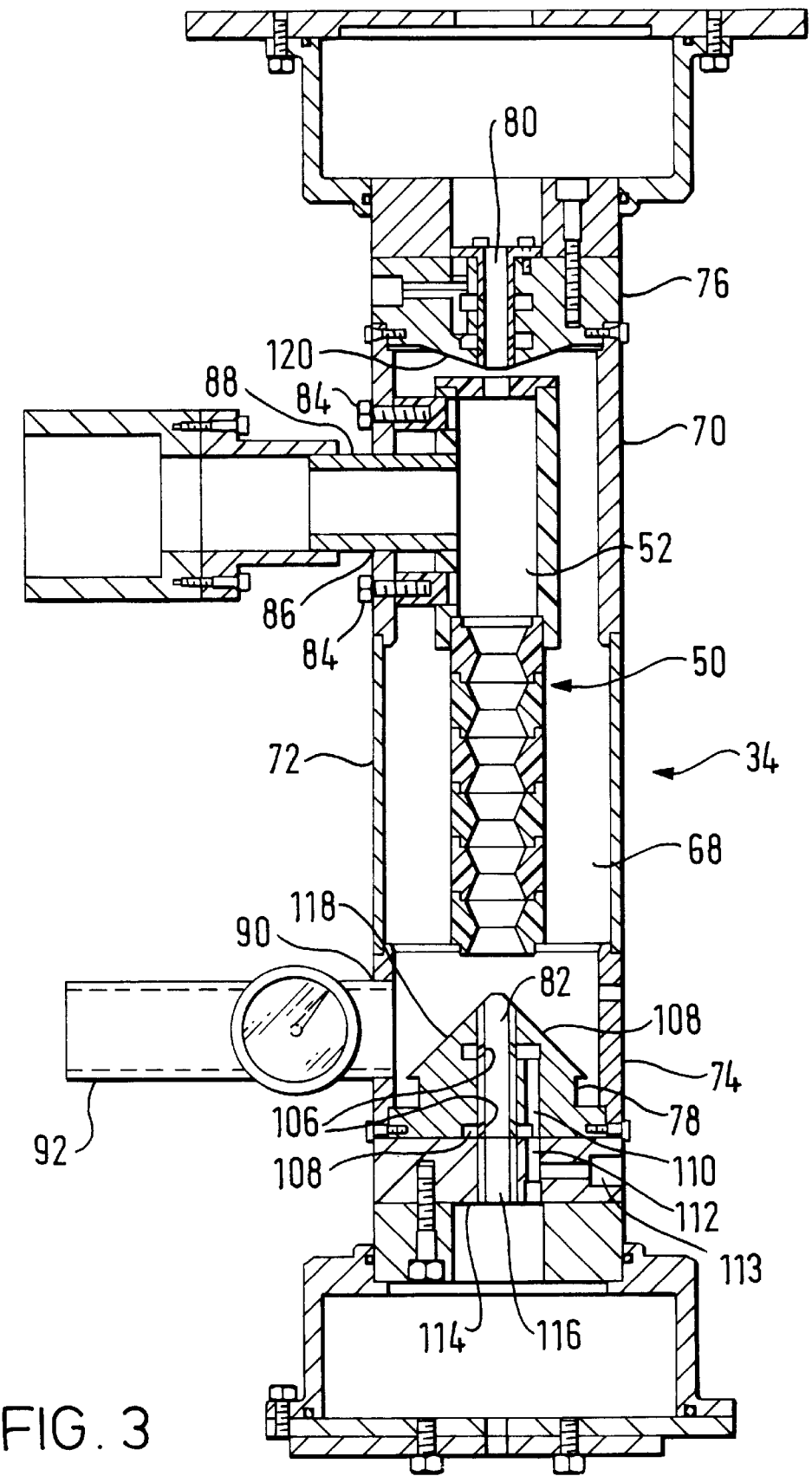
FIG. 3 is a cross-sectional view of an apparatus for use in applying particles to an external layer of uncured resin material of a coating of an optical fibre unit.
Figure 4:
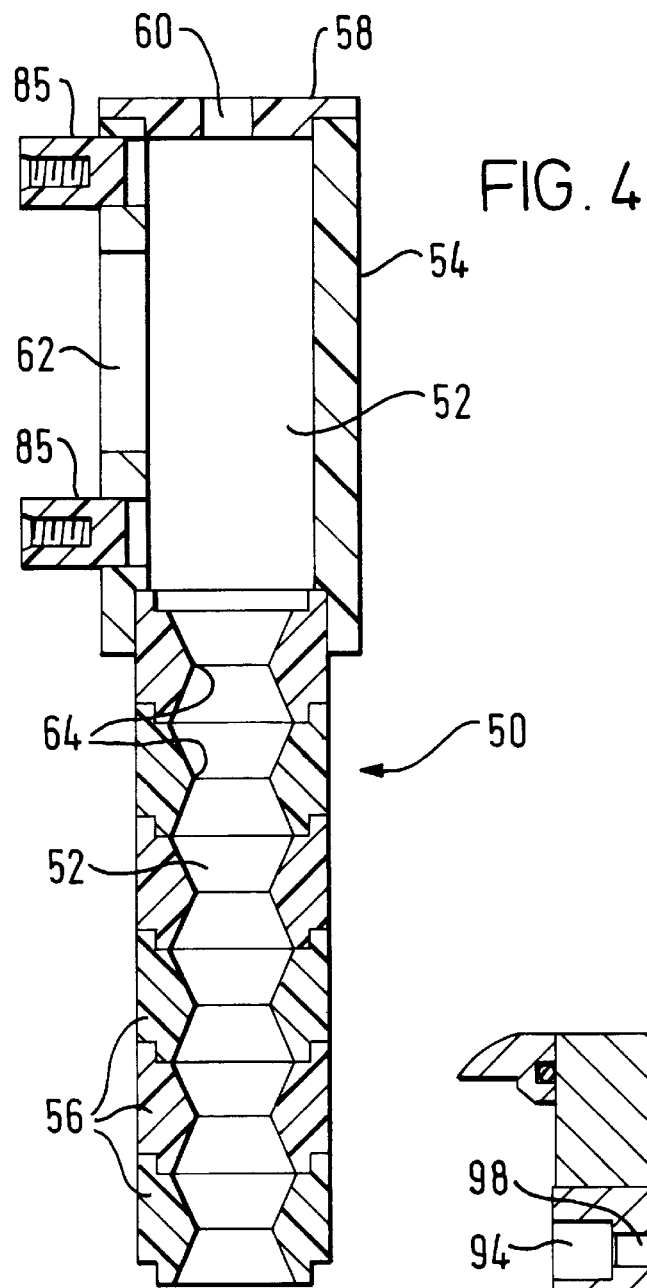
FIG. 4 is a cross-sectional view of a through-passage defining means of FIG. 3.

It will be appreciated that the through passage-defining means 160 could be used in place of the through-passage defining means 50 in the arrangements illustrated in FIG. 3 and FIG. 6. Furthermore, it will be appreciated that either of the through-passage defining means 50, 160 could be used in arrangements different to those shown in FIGS. 3 and 5 and in particular that it is not considered essential to house the entire through-passage defining means in a chamber as illustrated. Instead, for example, the ends of the through-passage defining means could be housed in individual chambers.

It will be understood that the turbulence generating means may comprise projections fitted to the surface, or surfaces, defining the through-passage.

We claim:

1. Optical fibre particle applying apparatus in which particles are applied to an external layer of uncured resin material of a coating of an optical fibre unit comprising at least one optical fibre, said apparatus comprising passage defining means defining an axially extending through-passage having upstream and downstream ends through which, in use, such an optical fibre unit is passed from the upstream end to the downstream end, said passage defining means having an inlet for admitting fluidised particles into said through-passage at one end of said passage and said through-passage being provided with surface means intermediate said ends of said through-passage and inwardly of said passage for deflecting said particles and for generating turbulence in such fluidised particles in said through-passage.

2. Apparatus as claimed in claim 1, wherein said surface means provides at least one restriction in said through-passage.

3. Apparatus as claimed in claim 2, wherein said surface means provides a plurality of said restrictions which are axially spaced in said through-passage.

4. Apparatus as claimed in claim 2, wherein said passage defining means has a surface encircling said through-passage and defining said through-passage and wherein the or each restriction is formed by a portion of said surface of said through-passage defining means which reduces the size of said through-passage.

5. Apparatus as claimed in claim 4, wherein the or each restriction comprises a generally triangular section rib defined by said surface.

6. Apparatus as claimed in claim 1, wherein said surface means for deflecting said particles and for generating turbulence comprises at least one auxiliary passage displaced from the axis of said through-passage and having an outlet end arranged for discharging fluidised particles into said through-passage.

7. Apparatus as claimed in claim 6, wherein the or each auxiliary passage has an inlet end arranged to receive fluidised particles from said through-passage.

8. Apparatus as claimed in claim 1, wherein said passage defining means comprises a plurality of segments each defining a part of a length of said through-passage, said segments being fitted together in end-to-end relationship.

9. Apparatus as claimed in claim 8, wherein said surface means for deflecting said particles and for generating turbulence are disposed in a portion of said through-passage defined by said segments.

10. Apparatus as claimed in claim 8, wherein each said segment defines at least one auxiliary passage, said segments being fitted together in end-to-end relationship such that the auxiliary passage or passages of each segment are radially offset from the auxiliary passage or passages of the or each adjacent segment.

11. Apparatus as claimed in claim 1, wherein said inlet for admitting fluidised particles into said through-passage is substantially perpendicular to the axis of said through-passage.

12. Apparatus as claimed in claim 1, further comprising means defining a chamber in which at least a downstream end of said through-passage defining means is housed, said chamber defining means having an outlet for such an optical fibre unit and discharge means for discharging excess such fluidised particles from said chamber.

13. Apparatus as claimed in claim 12, wherein said chamber defining means is provided with gas passage means for directing at least one gas stream into said chamber at least in the region of said outlet of the chamber defining means for substantially preventing blockage of at least said outlet of the chamber means by fluidised particles.

14. Apparatus as claimed in claim 13, wherein said gas passage means is arranged to direct at least one said gas stream into said outlet of the chamber defining means.

15. Apparatus as claimed in claim 12, wherein said chamber defining means defines a chamber in which all of said through-passage defining means is housed, said chamber defining means having an inlet for such an optical fibre unit and inlet means for communicating a flow of fluidised particles to said inlet of said through-passage defining means.

16. Apparatus as claimed in claim 15, comprising a gas passage means arranged for directing at least one gas stream into said inlet of the chamber defining means for substantially preventing blockage of said inlet by fluidised particles.

17. Apparatus as claimed in claim 12, further comprising deflecting means disposed in said chamber for deflecting fluidised particles away from said outlet of the chamber defining means.

18. Apparatus as claimed in claim 15, further comprising deflecting means disposed in said chamber for deflecting fluidised particles away from said inlet of the chamber defining means.

19. Apparatus as claimed in claim 17, wherein said deflecting means is integral with said chamber defining means.

20. Apparatus as claimed in claim 18, wherein said deflecting means is integral with said chamber defining means.

21. A method of manufacturing an optical fibre assembly for blown installation, comprising providing an optical fibre unit comprising at least one optical fibre having a coating comprising an external layer of uncured resin material, passing said unit through a turbulent flow of fluidised particles provided in an axially extending through-passage having surface means intermediate the axial ends thereof to deflect said particles and thereby generate said turbulent flow and such that some of the particles adhere to said external layer of uncured resin material, and curing said external layer.

22. A method as claimed in claim 21, wherein said turbulent flow of fluidised particles is provided by passing a flow of fluidised particles through at least one restriction provided by said surface means.

23. A method as claimed in claim 22, wherein said flow of fluidised particles is passed through a plurality of restrictions provided by said surface means and which restrictions are axially spaced in said through-passage.

24. A method as claimed in claim 21, wherein said turbulent flow of fluidised particles is provided by passing a flow of said particles through at least one auxiliary passage spaced from the axis of said through-passage and discharging said fluidised particles from the or each auxiliary passage into a flow of fluidised particles in said through-passage.

25. A method as claimed in claim 24, wherein the fluidised particles passed through the or each auxiliary passage are supplied from said flow of fluidised particles in said through-passage.

26. A method as claimed in claim 25, wherein the fluidised particles are passed through a series of axially spaced auxiliary passages, each auxiliary passage being radially offset from the passage or passages axially adjacent thereto.

27. A method as claimed in claim 21, comprising the step of inputting fluidised particles to said through-passage via an inlet disposed substantially perpendicular to the axis of said through-passage.

28. A method as claimed in claim 21, wherein at least a downstream end of said through-passage is defined by defining means which is disposed in a chamber having an outlet through which the optical fibre unit is passed and discharge means for discharging fluidised particles from the chamber, comprising the step of providing at least one gas stream into said chamber in the region of at least said outlet of the chamber for substantially preventing blockage of said outlet by fluidised particles.

29. A method as claimed in claim 28, comprising the step of providing at least one said gas stream in said outlet of the chamber.

30. A method as claimed in claim 28, wherein said through-passage is housed in said chamber which further comprises an inlet through which the optical fibre unit is passed and inlet means through which fluidised particles are supplied to said through-passage, comprising the step of providing at least one said gas stream in said inlet of the chamber for substantially preventing blockage of said inlet by fluidised particles.

31. A method as claimed in claim 21, comprising the step of deflecting fluidised particles away from said outlet of the chamber.

32. Optical fibre particle applying apparatus in which particles are applied to an external layer of uncured resin material of a coating of an optical fibre unit comprising at least one optical fibre, said apparatus comprising means defining a chamber having an axially aligned inlet and outlet through which, in use, such an optical fibre unit is passed, inlet means for admitting a flow of fluidised particles into the chamber and an outlet means for discharging such fluidised particles from the chamber, said chamber defining means being provided with means for directing gas toward the axis of said chamber and into said chamber in the region of said outlet and/or inlet for substantially preventing blockage thereof by such fluidised particles.

33. Apparatus as claimed in claim 32, wherein said gas directing means is arranged to direct at least one gas stream into said outlet.

34. Apparatus as claimed in claim 32, wherein said gas directing means is arranged for directing at least one gas stream into said inlet.

35. Apparatus as claimed in claim 32, further comprising deflecting means disposed in said chamber for deflecting such fluidised particles away from said outlet.

36. Apparatus as claimed in claim 32, further comprising deflecting means disposed in said chamber for deflecting such fluidised particles away from said inlet.

37. Apparatus as claimed in claim 35, wherein the or each deflecting means is integral with said chamber defining means.

38. A method of manufacturing an optical fibre assembly for blown installation, comprising providing an optical fibre unit comprising at least one optical fibre having a coating comprising an external layer of uncured resin material, providing a flow of fluidised particles in a chamber with an axis, passing said unit successively through an inlet into said chamber and an outlet therefrom such that some of the particles adhere to said external layer of uncured resin material, directing gas toward said axis into said chamber in the region of said outlet and/or inlet for at least substantially preventing said outlet and/or inlet from being blocked by said flow of fluid particles, and curing said external layer.

39. A method as claimed in claim 38, comprising the step of providing said gas in said outlet and/or inlet.

40. A method as claimed in claim 38 wherein said fluidised particles are gas fluidised particles.

41. Apparatus as claimed in claim 1 wherein said fluidised particles are gas fluidised particles.

42. A method as claimed in claim 21 wherein said fluidised particles are gas fluidised particles.

43. Apparatus as claimed in claim 32 wherein said fluidised particles are gas fluidised particles.

44. Optical fibre particle applying apparatus in which particles are applied to an external layer of uncured resin material of a coating of an optical fibre unit comprising at least one optical fibre, said apparatus comprising passage defining means defining an axially extending through-passage through which, in use, such an optical fibre unit is passed, said passage defining means having an inlet for admitting fluidised particles into said through-passage, and said through-passage being provided with a plurality of passage restrictions which are axially spaced in said through-passage and constitute means for generating turbulence in such fluidised particles in said through-passage.

45. Apparatus as claimed in claim 44 wherein said defining means has a surface encircling said through-passage and defining said through-passage and wherein each restriction is formed by a portion of said surface of said through-passage defining means which reduces the size of said through-passage.

46. Apparatus as claimed in claim 45, wherein each restriction comprises a generally triangular section rib defined by said surface.

47. Apparatus as claimed in claim 44, wherein said means for generating turbulence comprises at least one auxiliary passage displaced from the axis of said through-passage and having an outlet end arranged for discharging fluidised particles into said through-passage.

48. Apparatus as claimed in claim 47, wherein the or each auxiliary passage has an inlet end arranged to receive fluidised particles from said through-passage.

49. Apparatus as claimed in claim 44, wherein said passage defining means comprises a plurality of segments each defining a part of a length of said through-passage, said segments being fitted together in end-to-end relationship.

50. Apparatus as claimed in claim 49, wherein said means for generating turbulence are disposed in a portion of said through-passage defined by said segments.

51. Apparatus as claimed in claim 49, wherein each said segment defines at least one auxiliary passage, said segments being fitted together in end-to-end relationship such that the auxiliary passage or passages of each segment are radially offset from the auxiliary passage or passages of the or each adjacent segment.

52. Apparatus as claimed in claim 44, wherein said inlet for admitting fluidised particles into said through-passage is substantially perpendicular to the axis of said through-passage.

53. Apparatus as claimed in claim 44, further comprising means defining a chamber in which at least a downstream end of said through-passage defining means is housed, said chamber defining means having an outlet for such an optical fibre unit and discharge means for discharging excess said fluidised particles from said chamber.

54. Apparatus as claimed in claim 53, wherein said chamber defining means is provided with gas passage means for directing at least one gas stream into said chamber at least in the region of said outlet of the chamber defining means for substantially preventing blockage of at least said outlet of the chamber means by fluidised particles.

55. Apparatus as claimed in claim 54, wherein said gas passage means is arranged to direct at least one said gas stream into said outlet of the chamber defining means.

56. Apparatus as claimed in claim 53, wherein said chamber defining means defines a chamber in which all of said through-passage defining means is housed, said chamber defining means having an inlet for such an optical fibre unit and inlet means for communicating a flow of fluidised particles to said inlet of said through-passage defining means.

57. Apparatus as claimed in claim 56, comprising a gas passage means arranged for directing at least one said gas stream into said inlet of the chamber defining means for substantially preventing blockage of said inlet by fluidised particles.

58. Apparatus as claimed in claim 53, further comprising deflecting means disposed in said chamber for deflecting fluidised particles away from said outlet of the chamber defining means.

59. Apparatus as claimed in claim 56, further comprising deflecting means disposed in said chamber for deflecting fluidised particles away from said inlet of the chamber defining means.

60. Apparatus as claimed in claim 58, wherein said deflecting means is integral with said chamber defining means.

61. Apparatus as claimed in claim 56, wherein said deflecting means is integral with said chamber defining means.

62. Optical fibre particle applying apparatus in which particles are applied to an external layer of uncured resin material of a coating of an optical fibre unit comprising at least one optical fibre, said apparatus comprising passage defining means defining an axially extending through-passage through which, in use, such an optical fibre unit is passed, said passage defining means having an inlet for admitting fluidised particles into said through-passage, and said through-passage being provided with means for generating turbulence in such fluidised particles in said through-passage, said turbulence generating means comprising at least one auxiliary passage displaced from the axis of said through passage and having an outlet end arranged for discharging fluidised particles into said through-passage.

63. Apparatus as claimed in claim 62, wherein the or each auxiliary passage has an inlet end arranged to receive fluidised particles from said through-passage.

64. A method of manufacturing an optical fibre assembly for blown installation, comprising providing a fibre unit comprising at least one optical fibre having a coating comprising an external layer of uncured resin material, passing said unit through a turbulent flow of fluidised particles provided in an axially extending through-passage such that some of the particles adhere to said external layer of uncured resin material, and curing said external layer, wherein said turbulent flow is generated by passing fluidised particles through at least one auxiliary passage and discharging said fluidised particles from the or each auxiliary passage into a flow of fluidised particles in said through-passage.

65. A method as claimed in claim 64, wherein the fluidised particles passed through the or each auxiliary passage are supplied from said flow of fluidised particles in said through-passage.

66. A method as claimed in claim 65, wherein the fluidised particles are passed through a series of axially spaced auxiliary passages, each auxiliary passage being radially offset from the passage or passages axially adjacent thereto.

67. Optical fibre particle applying apparatus in which particles are applied to an external layer of uncured resin material of a coating of an optical fibre unit comprising at least one optical fibre, said apparatus comprising:

an inlet for receiving said optical fibre unit;

an outlet for said optical fibre unit spaced from said inlet in the direction of an axis;

means defining a through-passageway extending substantially parallel to said axis and intermediate said inlet and said outlet, said passageway permitting the passage of said optical fibre unit therethrough; and means for introducing fluidised particles into said passageway at a portion thereof nearer said inlet than said outlet;

said means defining a through-passageway having surface means in said passageway for deflecting said particles and generating turbulence in said fluidised particles as said particles pass from said portion of said passageway to a portion of said passageway farther from said inlet than said portion nearer said inlet.

68. Apparatus as claimed in claim 67, wherein said means for introducing fluidised particles into said passageway comprises an inlet port which is connected to a container for said particles which container is connectable to a source of pressurised fluid for fluidising said particles in said container prior to admission into said passageway through said inlet port.

* * * * *

UNITED STATES PATENT AND TRADEMARK OFFICE
CERTIFICATE OF CORRECTION

PATENT NO. : 5,851,450
DATED     : Dec. 22, 1998
INVENTOR(S) : Rennie and Curley It is certified that error appears in the above-identified patent and that said Letters Patent is hereby corrected as shown below:

Col. 9, line 44, change "such" to --said--.

Signed and Sealed this

Twentieth Day of July, 1999

Attest:

Q. TODD DICKINSON

Attesting Officer

Acting Commissioner of Patents and Trademarks